(12) United States Patent
Farrell

(10) Patent No.: US 8,616,809 B2
(45) Date of Patent: Dec. 31, 2013

(54) TOOLHOLDER

(76) Inventor: James F. Farrell, Meriden, CT (US)

( * ) Notice: Subject to any disclaimer, the term of this patent is extended or adjusted under 35 U.S.C. 154(b) by 431 days.

(21) Appl. No.: 11/858,425

(22) Filed: Sep. 20, 2007

(65) Prior Publication Data

US 2008/0170918 A1      Jul. 17, 2008

Related U.S. Application Data

(60) Provisional application No. 60/880,913, filed on Jan. 17, 2007.

(51) Int. Cl.
*B26D 7/01*      (2006.01)

(52) U.S. Cl.
USPC ............................ 407/102; 407/103; 407/104

(58) Field of Classification Search
USPC ............... 407/66, 67, 77, 102, 103, 104, 105, 407/106, 113
See application file for complete search history.

(56) References Cited

U.S. PATENT DOCUMENTS

| | | | |
|---|---|---|---|
| 1,478,967 A | | 12/1923 | Lee |
| 1,629,667 A | * | 5/1927 | Knipple ...................... 407/103 |
| 2,458,244 A | | 1/1949 | Bohl |
| 2,524,401 A | | 10/1950 | Schwab |
| 2,848,789 A | * | 8/1958 | Friedline ........................ 407/6 |
| 3,097,417 A | * | 7/1963 | Hill ............................... 407/104 |
| 3,137,918 A | * | 6/1964 | Breuning ..................... 407/113 |
| 3,157,078 A | | 11/1964 | Powers |
| 3,268,978 A | * | 8/1966 | Reck ............................... 407/5 |
| 3,299,489 A | * | 1/1967 | Pohle ........................... 407/104 |
| 3,341,919 A | * | 9/1967 | Lovendahl .................... 407/104 |
| 3,381,349 A | * | 5/1968 | Newcomer .................... 407/104 |
| 3,393,435 A | | 7/1968 | Viellet |
| 3,488,822 A | * | 1/1970 | Jones ............................ 407/105 |
| 3,491,421 A | * | 1/1970 | Holloway ..................... 407/105 |
| 3,540,102 A | * | 11/1970 | Yogus et al. .................. 407/104 |

(Continued)

FOREIGN PATENT DOCUMENTS

| | | | |
|---|---|---|---|
| DE | 10200502627 | * | 12/2006 |
| EP | 143569 A | * | 6/1985 |

(Continued)

OTHER PUBLICATIONS

Translation of SU 1234053 A.*

(Continued)

*Primary Examiner* — Kenneth E. Peterson
*Assistant Examiner* — Jennifer Swinney
(74) *Attorney, Agent, or Firm* — McCormick, Paulding & Huber LLP

(57) ABSTRACT

The present invention provides a toolholder mountable on a lathe or other machine tool for supporting a cutting plate relative to a workpiece for cutting or shaping the workpiece. The toolholder including a body having a tapered tool base at one end thereof, the tool base defining a tool seat for supporting a cutting plate. A plug screw having a head defining threads on an outer surface thereof for engaging a threaded hole in the tool base is also provided. The plug screw further defining a shank extending eccentrically from the head, the shank being receivable through a mounting hole defined by the cutting plate for locating the cutting plate relative to the tool seat upon rotation of the plug screw relative to the tool base. A lock nut is provided for receiving a threaded end of the shank for securing the cutting plate to the tool base and toolholder.

16 Claims, 1 Drawing Sheet

(56) References Cited

U.S. PATENT DOCUMENTS

| | | | |
|---|---|---|---|
| 3,543,364 A | 12/1970 | MacKew | |
| 3,672,016 A * | 6/1972 | Melinder | 407/104 |
| 3,688,366 A | 9/1972 | Jones | |
| 3,787,941 A * | 1/1974 | Novkov | 407/105 |
| 3,815,195 A * | 6/1974 | McCreery | 407/105 |
| 4,044,440 A * | 8/1977 | Stier | 407/105 |
| 4,364,693 A * | 12/1982 | Lindsay | 407/104 |
| 4,583,886 A * | 4/1986 | Drescher | 407/40 |
| 4,720,216 A * | 1/1988 | Smith | 407/113 |
| 4,869,624 A * | 9/1989 | Viellet | 407/104 |
| 5,004,378 A * | 4/1991 | Arai et al. | 407/106 |
| 5,076,738 A * | 12/1991 | Pano et al. | 407/110 |
| 5,199,828 A * | 4/1993 | Forsberg et al. | 407/104 |
| 5,346,336 A * | 9/1994 | Rescigno | 407/104 |
| 5,411,354 A * | 5/1995 | Gustafsson | 407/110 |
| 6,155,753 A | 12/2000 | Chang | |
| 6,190,095 B1 * | 2/2001 | Schmidt | 407/104 |
| 6,579,044 B1 * | 6/2003 | Trenkwalder et al. | 407/110 |
| 2006/0239786 A1 * | 10/2006 | Hecht et al. | 407/48 |
| 2006/0269366 A1 * | 11/2006 | Rieth | 407/113 |

FOREIGN PATENT DOCUMENTS

| | | | |
|---|---|---|---|
| GB | 2081142 A | * | 2/1982 |
| GB | 2157205 A | * | 10/1985 |
| JP | 2000237904 A | * | 9/2000 |
| SU | 787141 B | * | 7/1963 |
| SU | 1234053 A | * | 5/1986 |

OTHER PUBLICATIONS

English Translation of SU 1234053A, Retrieved Jul. 28, 2011.*

* cited by examiner

TOOLHOLDER

CROSS REFERENCE TO RELATED APPLICATIONS

This application claims priority to a prior U.S. provisional application Ser. No. 60/880,913 filed on Jan. 17, 2007 entitled "Assembly for Locking a Cutting Plate onto the Body of a Toolholder", which is incorporated herein by reference in its entirety.

FIELD OF THE INVENTION

The present invention generally relates to a toolholder for a lathe or other machine tool wherein a cutting plate is mounted to the toolholder for positioning relative to a rotating workpiece, and more particularly, to a toolholder including a plug screw for mounting a cutting plate onto the body of the toolholder.

BACKGROUND OF THE INVENTION

Toolholders made of steel having replaceable cutting inserts or cutting plates made of harder materials such as carbide, ceramic or diamond attachable to the toolholder are well known in the tool bit industry. Typically, a cutting plate is attached to the toolholder using a screw or clamp or other type of mechanism.

Many prior art devices for attaching a cutting plate to a toolholder include multiple components rendering the devices expensive and the process of attaching or removing a cutting plate to or from a toolholder both time consuming and cumbersome.

Other designs of prior art toolholders and associated devices for attaching a cutting plate to the toolholder include only a screw for securing the cutting plate to a surface of the toolholder and provide nothing for locating the cutting plate relative to the toolholder.

Based on the foregoing, it is the general object of the present invention to provide an improved toolholder that improves upon, or overcomes the problems and drawbacks associated with the prior art.

SUMMARY OF THE INVENTION

The present invention provides a toolholder mountable on a lathe or other machine tool for supporting a cutting tool relative to a workpiece for cutting or shaping the workpiece. The toolholder including a body having a tapered tool base at one end thereof, the tool base defining a tool seat for supporting a cutting plate. The tool base further defining a threaded hole extending through the tool base and tool seat and oriented substantially perpendicular to the tool seat. A plug screw having a head defining threads on an outer surface thereof for engaging the threaded hole in the tool base is also provided. The plug screw defining a shank extending eccentrically from the head, the shank defining a middle portion and a threaded end portion. The plug screw being receivable in the threaded hole defined by the tool base, shank end first, such that the shank extends outwardly from the tool seat. The middle portion of the shank being receivable through a mounting hole defined by the cutting plate for locating the cutting plate relative to the tool seat upon rotation of the plug screw relative to the tool base. A lock nut is provided for receiving the threaded end portion of the shank for securing the cutting plate to the tool base and toolholder by tightening the lock nut about the shank of the plug screw and against the cutting plate thereby securing the cutting plate on the tool seat.

In a preferred embodiment, the body defines a tool recess for receiving a cutting plate, the tool recess is defined in part by a surface of the tool base which forms the tool seat. A rear wall defined by the body and extending substantially perpendicular to the tool seat further defines the tool recess, the rear wall for supporting a sidewall of the cutting plate during a cutting process.

One advantage of the present invention is that the plug screw including the eccentric shank thereof provides for locating a cutting plate relative to the tool base. Many prior art devices having do not provide for locating a cutting plate relative to a tool base. In the present invention the plug screw allows the cutting plate to be first indexed against a rear wall of a tool recess such that the rear wall of the tool recess provides lateral support for the cutting plate during a cutting process. Prior art toolholders having only a standard screw for securing a cutting plate to the toolholder do not provide any means for indexing the cutting plate against a rear wall of a tool recess for providing lateral support for the cutting plate relative to a work piece.

Another advantage of the present invention is that the plug screw and lock nut therefor provide an economical device for both locating a cutting plate relative to the tool seat and securing the cutting plate to the tool seat and tool base.

The foregoing and still other objects and advantages of the present invention will be more apparent from the following detailed explanation of the preferred embodiments of the invention in connection with the accompanying drawings wherein throughout the figures, like reference numerals describe like elements of the invention.

DETAILED DESCRIPTION OF THE INVENTION

Figure 1:
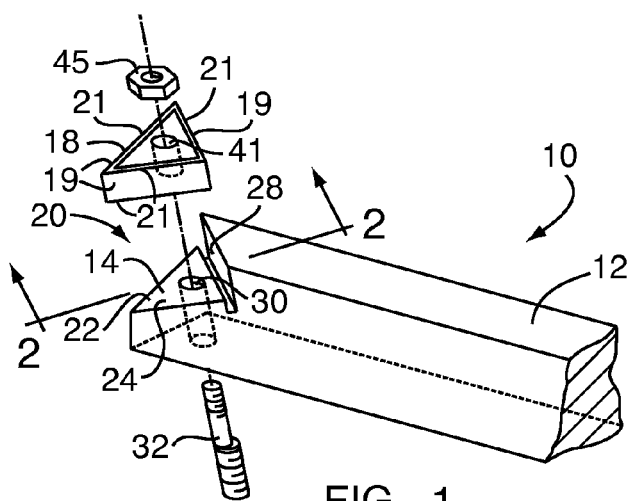
FIG. 1 is an exploded perspective view of one embodiment of a toolholder in accordance with the present invention shown with a cutting plate mountable thereto.

Referring to the Figures, the present invention toolholder is generally referred to with the reference numeral 10. The toolholder 10 includes a body 12 having a tapered tool base 14 at one end thereof. A cutting plate 18 being removably mountable to the tool base 14. The toolholder 10 being mountable on a lathe or other machine tool (not shown) for securing the cutting plate 18 in a cutting position relative to a work piece (also not shown).

Figure 2:
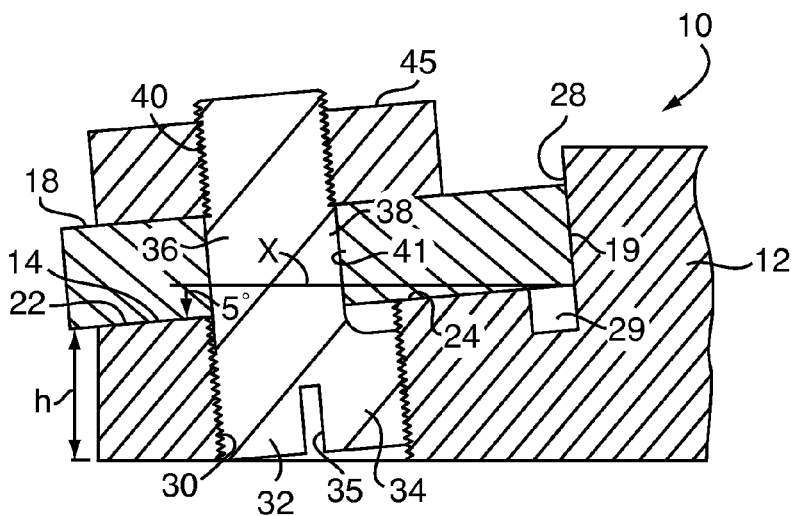
FIG. 2 is a partial sectional view of the toolholder of FIG. 1 taken along the line 2-2.

As shown in the FIGS. 1 and 2, the body 12 defines the tapered tool base 14 formed at one end of the toolholder 10. As is well known in the art, the tapered tool base 14 allows the cutting plate 18 to be closely positioned relative to a workpiece for cutting the workpiece including corners and other areas thereof. Typically, the tool base 14 is generally triangular-shaped as viewed from above the toolholder 10, and, depending on the application, can be oriented in various positions relative to a length of the body 12 providing various left hand (left-angled), right hand (right-angled) or straight configurations of the toolholder 10. The toolholder 10 of FIG. 1 is an example of a right hand or right-angled tool holder in accordance with the present invention. In other embodiments of the present invention, a tool base 14 is provided at both of the opposing ends of the body 12 of the toolholder.

A tool recess 20 is formed in part by a tool seat 22 which is defined by a surface 24 of the tool base 14. The tool seat 22 providing a support surface for receiving the cutting plate 18 thereon. The tool recess 20 being further defined by a rear wall 28 extending generally perpendicular to a plane of the tool seat 22 for engaging a sidewall 19 of the cutting plate 18 thereagainst and supporting the cutting plate laterally, opposite the workpiece during a cutting process. In the illustrated embodiment, the tool seat 22 is disposed at an angle of inclination of about 5 degrees below horizontal thereby providing a negative rake angle for the cutting plate 18. The effective rake angle of the cutting plate 18 is determined by combining the angle of inclination of the tool seat 22 and any rake angle built into the cutting plate 18.

As shown in FIG. 2, in the illustrated embodiment, the angle of inclination of the tool seat 22 is about 5 degrees measured downwardly from a horizontal line X extending parallel to a length of the body 12 and outwardly from the juncture of the planes defined by the tool seat 22 and that of the rear wall 28 thereby providing a negative rake angle of about 5 degrees. In other embodiments of the toolholder 10, the angle of inclination of the tool seat 22 can be varied ranging from positive, negative or zero angular inclinations. Depending on the material of the workpiece, and/or the location and depth of the desired cut, the angle of inclination can be configured for providing an optimal rake angle between the cutting tool and the workpiece.

As also shown in FIG. 2, the tool base 14 further defines a threaded bore 30 through a height, h thereof for receiving a plug screw 32 therein. The threaded bore 30 being oriented generally perpendicular to the plane of the tool seat 22 and extending through the tool base 14 and the tool seat. The plug screw 32 for locating the cutting plate 18 relative to the tool seat 22 and the tool base 14 and securing the cutting plate to the tool base and toolholder 10. Preferably, the threaded bore 30 is located approximately in the center of the tool base 14 for positioning the cutting plate 18 centrally located on the tool base 14 such that a sidewall thereof is engageable with the rear wall 28 of the tool base for supporting the cutting plate laterally relative to a workpiece.

Figure 3:
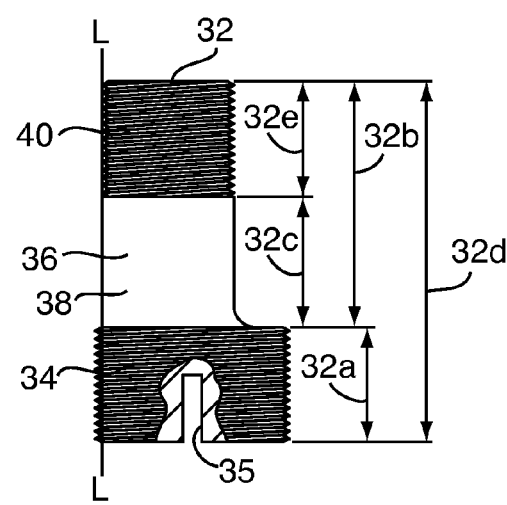
FIG. 3 is a side elevational view of the plug screw of the toolholder of FIG. 1.

Referring to FIG. 3, the plug screw 32 includes a threaded head 34 and an eccentric shank 36 extending therefrom. In the illustrated embodiment, the shank 36 is lengthwise aligned (generally) with the head 34 along the line L-L such that the outer diameter of the head is approximately aligned with the outer diameter of the shank; the shank 36 being slightly offset relative to the head such that the shank will not interfere with the threads defined by the threaded bore 30. The head 34 defines a screwdriver slot 35 for turning the plug screw relative to the tool base 14. In other embodiments of the plug screw 32, the head 34 defines a hexagonal socket for receiving a hex key. The shank 36 defining a smooth middle portion 38 and a threaded end portion 40. The shank 36 for locating the cutting plate 18 relative to the tool seat 22 and tool base 14 and for securing the cutting plate 18 to the tool base and toolholder 10.

FIG. 2 shows the toolholder 10 with the cutting plate 18 mounted thereto. The cutting plate 18 defining a mounting hole 41 for receiving the shank 36 of the plug screw 32. The middle portion 38 of the shank 36 having an outside diameter corresponding to the size of the mounting hole 41 in the cutting plate 18 so that the cutting plate fits snugly about the shank. Due to the snug fit of the cutting plate 18 about the middle portion 38 of the shank 36 of the plug screw 32, rotation of the plug screw including the eccentric shank causes a lateral displacement of the cutting plate 18 relative to the tool seat 22 and tool base 14 for positioning the cutting plate with respect to the toolholder 10. A lock nut 45 engages the threaded end portion 40 of the shank 36 for securing the cutting plate to the tool seat 22.

As shown in FIG. 3, the head 34 of the plug screw has a length 32a which is less than the height h of the tool base 14 so that the head fits entirely within the height of the tool base. Thus, when the head 34 of the plug screw is threaded entirely within the threaded bore 30, the head does not extend beyond the tool base 14 and will not interfere in mounting the toolholder 10 to a machine tool (not shown) or with a cutting plate 18 mounted about the shank 36 of the plug screw and flush on the tool seat 22. Still referring to the FIG. 3, the shank 36 of the plug screw 32 has a length 32b which is long enough to extend through both the cutting plate 18 and the lock nut 45. Preferably, the smooth middle portion 38 of the shank 36 having a length 32c, extends throughout a height of the cutting plate 18 for engagement therewith. As also shown in FIG. 3, the overall length of the plug screw 32 is identified by the reference numeral 32d which includes the length of the head 32a added to the length of shank 32b. The length of the threaded end portion of the shank 36 is identified with the reference numeral 32e.

Referring again to FIG. 2, the tool holder 10 further defines an undercut 29 extending outwardly from the tool recess 20 and extending into the tool base 14 along the juncture of the tool seat 22 and the rear wall 28 to allow clearance of the sharpened edges 21 of the cutting plate 18 when the cutting plate is mounted to the tool seat 22. Typically, the cutting plate 18 is usable on both sides and defines multiple cutting edges 21 extending outwardly from the sidewalls 19 of the cutting plate. For example, a triangular-shaped cutting plate 18 as shown in FIGS. 1 and 2 provides three adjoining cutting edges 21 defined in part by the sidewalls 19 of the cutting plate, such that the cutting plate provides a total of six cutting edges 21. As shown in FIG. 2, when the cutting plate 18 is mounted to the toolholder 10, one of the cutting edges 21, which is not in use, is positioned adjacent the rear wall 28 of the tool recess 20 and would abut the tool seat 22 if not for the undercut 29. Thus, the undercut 29 helps to ensure the cutting plate 18 mounts flush on the tool seat 22.

In use of the tool holder 10, the plug screw 32 is inserted into the threaded bore 30, shank end first, and threadably engaged therewith such that the head 34 of the plug screw is fully inserted into the tool base 14 and the shank 36 extends outwardly from the tool seat 22. A cutting plate 18 is then placed on the tool seat 22 with the plug screw 32 received through the mounting hole 41 in the cutting plate. The middle portion 38 of the shank 36 of the plug screw 32 being aligned with the cutting plate 18 when the cutting plate is resting on the tool seat 22. Rotation of the plug screw 32 causes the cutting plate 18 to move laterally relative to the tool seat 22. Preferably, the plug screw 32 is rotated in a clockwise direction when viewed from above the toolholder 10 causing the cutting plate 18 to move towards, and into engagement with, or indexed against, the rear wall 28 of the tool recess 20 for supporting the cutting plate during a cutting process. Typically, only a slight rotation of the plug screw 32 (approximately 5 to 100 degrees rotation) is enough to move the cutting plate 18 into abutment with the rear wall 28 of the tool recess 20. Thus, the cutting plate 18 is preferably indexed against the rear wall 28 in the same direction of rotation as used to thread the lock nut 45 onto the plug screw 32 so that the indexing of the cutting plate is not disturbed by installing the lock nut, but rather secured in place as located relative to the tool base 14 and rear wall 28. The lock nut 45 is threaded onto the end portion 40 of the plug screw 32 and tightened against an upper surface of the cutting plate 18 securing the same to the toolholder 10. The lock nut 45 being centrally located relative to the cutting plate 18 distributes a clamping force provided by the lock nut evenly throughout the area of the cutting plate for securely mounting the cutting plate to the toolholder 10. Once the cutting plate 18 is mounted to the toolholder 10 as set forth above, the toolholder can be mounted onto a lathe or other machine tool for use therewith.

Alternatively, depending on the configuration of an associated lathe or other machine tool, the cutting plate 18 may be removed and replaced on the toolholder 10 without removing the toolholder from the machine tool.

Accordingly, the toolholder 10 of the present invention provides a reliable and inexpensive tool for quickly, accurately and securely mounting a cutting plate 18 to the toolholder using the plug screw 32 and the lock nut 45. The configuration of the toolholder 10 and the plug screw 32 are compatible with the use of various low cost cutting plates 18 providing for cost-effective cutting processes. Further, the toolholder 10 of the present invention provides a locking mechanism for mounting the cutting plate to the toolholder using only the single plug screw 32 and lock nut 45 which provide a locking mechanism which is considerably less expensive than more complex locking mechanisms currently available.

The foregoing description of embodiments of the present invention have been presented for the purpose of illustration and description and are not intended to be exhaustive or to limit the invention to the form disclosed. Obvious modifications and variations are possible in light of the above disclosure. The embodiments described were chosen to best illustrate the principals of the invention and practical applications thereof to enable one of ordinary skill in the art to utilize the invention in various embodiments and with various modifications as suited to the particular use contemplated. It is intended that the scope of the invention be defined by the claims appended hereto.

What is claimed is:

1. A toolholder comprising:
   a body having a tapered tool base at one end thereof, said tool base defining a tool seat for supporting a cutting plate and a rear wall extending substantially perpendicular to said tool seat, wherein said tool seat leads to an undercut along a juncture of said tool seat and said rear wall for ensuring a cutting plate lies flat on said tool seat;
   said tool base defining a threaded hole extending through said tool base and tool seat, said threaded hole being oriented substantially perpendicular to said tool seat;
   a plug screw having a head at one end defining threads on an outer surface thereof for engaging said threaded hole, said plug screw including a shank extending eccentrically from said head along an axis parallel to the axis of said head, said shank defining a smooth middle portion and a threaded portion at an end opposite the head, whereby the plug screw has threads on the head at one end, threads on the eccentric shank at the end opposite the head, and the smooth middle portion therebetween;
   said threaded head of the plug screw being receivable in said threaded hole defined by said tool base, wherein said shank extends outwardly from said tool seat when said head of the plug screw is received in said threaded hole, said smooth middle portion of said eccentrically extending shank being receivable in a mounting hole defined in a cutting plate for locating the cutting plate firmly against the rear wall upon rotation of said plug screw relative to said tool base; and
   a lock nut for receiving said threaded portion of said shank, said lock nut for securing a cutting plate against the tool seat of said tool base.

2. The toolholder according to claim 1 wherein said tool base is generally triangular-shaped forming one of a right-angled, a left-angled, and a straight toolholder.

3. The toolholder according to claim 1 wherein said body further defines a tool recess for receiving the cutting plate, the tool recess defined in part by the tool seat.

4. The toolholder according to claim 1 wherein said tool seat defines an angular surface for supporting a cutting plate and establishing a rake angle between the cutting plate and a workpiece.

5. The toolholder according to claim 1 wherein one side of an outer diameter of the shank of the plug screw is generally aligned with the outer surface of the head thereof.

6. The toolholder according to claim 1 wherein said plug screw further defines a slot or socket for turning the plug screw.

7. A toolholder comprising:
   a body defining a tapered tool base at one end thereof, said tool base partially defining a tool recess for receiving a cutting plate therein;
   said tool base defining a tool seat for supporting a cutting plate;
   a rear wall defined by said body extending substantially perpendicular to said tool seat, said rear wall further defining said tool recess;
   said tool base defining a threaded hole therethrough, said threaded hole extending through said tool seat and oriented substantially perpendicular thereto;
   a plug screw having a head defining threads on an outer surface thereof for engaging said threaded hole defined by said tool seat, said plug screw further defining a shank extending eccentrically from said head along an axis parallel to the axis of said head, said shank defining a smooth middle portion and a threaded end portion disposed at the end of the plug screw opposite from the threaded head;
   said threaded head of the plug screw being receivable in said threaded hole defined by said tool base, wherein said shank extends outwardly from said tool seat and into said tool recess when said plug screw is received in said threaded hole, said smooth middle portion of said shank being receivable in a mounting hole defined in a cutting plate for locating the cutting plate firmly against said rear wall of said tool recess via eccentric rotation of said smooth middle portion of said plug screw relative to said tool base; and
   a lock nut for receiving said threaded end portion of said shank, said lock nut for securing a cutting plate firmly against the tool seat of said tool base and tool holder after the cutting plate is located firmly against the rear wall of the tool recess.

8. The toolholder according to claim 7 wherein said tool base is tapered to form one of a right angled, left angled or straight toolholder.

9. The toolholder according to claim 7 wherein said tool seat defines an angle of inclination for providing a rake angle between the cutting plate and a workpiece.

10. The toolholder according to claim 9 wherein said angle of inclination is about five degrees below a horizontal axis extending outwardly from said tool body at a juncture of said tool seat and said rear wall.

11. The toolholder according to claim 7 wherein said tool seat defines an undercut disposed along a juncture of said tool seat and said rear wall of said tool recess for ensuring that the cutting plate lies flat on said tool seat, and wherein said rear wall extends substantially perpendicularly from said undercut.

12. A toolholder comprising:

a body having a tapered tool base at one end thereof, said tool base defining a tool seat for supporting a cutting plate and a rear wall extending substantially perpendicular to said tool seat, wherein said tool seat defines an undercut along a juncture of said tool seat and said rear wall for ensuring the cutting plate lies flat on said tool seat, wherein said rear wall extends substantially perpendicularly from said undercut, and wherein said tool seat defines an angular surface for supporting the cutting plate and establishes a non-positive rake angle between the cutting plate and a workpiece;

said tool base defining a threaded hole extending through said tool base and tool seat, said threaded hole being oriented substantially perpendicular to said tool seat;

a plug screw having a head at one end defining threads on an outer surface thereof for engaging said threaded hole, said plug screw including a shank extending eccentrically from said head along an axis parallel to the axis of said head, said shank defining a smooth middle portion and a threaded portion at an end opposite the head;

said threaded head of the plug screw being receivable in said threaded hole defined by said tool base, wherein said shank extends outwardly from said tool seat when said head of the plug screw is received in said threaded hole, said smooth middle portion of said shank being receivable in a mounting hole defined in a cutting plate for locating the cutting plate firmly against the rear wall upon eccentric rotation of said plug screw relative to said tool base; and a lock nut for receiving said threaded portion of said shank, said lock nut for securing a cutting plate against the tool seat of said tool base.

13. The toolholder according to claim 12 wherein said tool base is generally triangular-shaped forming one of a right-angled, a left-angled, and a straight toolholder.

14. The toolholder according to claim 12 wherein said body further defines a tool recess for receiving the cutting plate, the tool recess defined in part by the tool seat.

15. The toolholder according to claim 12 wherein one side of an outer diameter of the shank of the plug screw is generally aligned with the outer surface of the head thereof.

16. The toolholder according to claim 12 wherein said plug screw further defines a slot or socket for turning the plug screw.

\* \* \* \* \*